(12) United States Patent
Hsieh

(10) Patent No.: US 7,302,684 B2
(45) Date of Patent: Nov. 27, 2007

(54) SYSTEMS AND METHODS FOR MANAGING A RUN QUEUE

(75) Inventor: Bor-Ming Hsieh, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 963 days.

(21) Appl. No.: 09/884,009

(22) Filed: Jun. 18, 2001

(65) Prior Publication Data

US 2002/0194249 A1 Dec. 19, 2002

(51) Int. Cl.
*G06F 9/46* (2006.01)
*G06F 13/00* (2006.01)
*H04L 12/28* (2006.01)
*H04L 12/56* (2006.01)

(52) U.S. Cl. ............... 718/102; 718/103; 718/104; 710/112; 370/412

(58) Field of Classification Search ........ 718/102–104; 710/112; 370/412
See application file for complete search history.

(56) References Cited

U.S. PATENT DOCUMENTS

| | | | | |
|---|---|---|---|---|
| 5,274,642 A | * | 12/1993 | Widjaja et al. | 370/411 |
| 5,379,297 A | * | 1/1995 | Glover et al. | 370/234 |
| 5,406,556 A | | 4/1995 | Widjaja et al. | |
| 5,440,553 A | * | 8/1995 | Widjaja et al. | 370/411 |
| 5,872,938 A | * | 2/1999 | Williams | 710/112 |
| 6,003,101 A | * | 12/1999 | Williams | 710/112 |
| 6,081,507 A | * | 6/2000 | Chao et al. | 370/235 |
| 6,370,144 B1 | | 4/2002 | Chao et al. | |
| 6,389,031 B1 | | 5/2002 | Chao et al. | |
| 6,411,982 B2 | * | 6/2002 | Williams | 718/102 |
| 6,501,731 B1 | * | 12/2002 | Chong et al. | 370/230.1 |
| 6,570,876 B1 | * | 5/2003 | Aimoto | 370/389 |
| 6,609,161 B1 | * | 8/2003 | Young | 710/5 |
| 6,724,767 B1 | * | 4/2004 | Chong et al. | 370/412 |
| 6,742,053 B1 | | 5/2004 | Young | |
| 6,789,134 B1 | | 9/2004 | Young | |
| 6,883,042 B1 | | 4/2005 | Young | |
| 6,937,561 B2 | | 8/2005 | Chiussi et al. | |
| 6,938,102 B1 | | 8/2005 | Young | |
| 2002/0141427 A1 | * | 10/2002 | McAlpine | 370/413 |
| 2004/0028067 A1 | | 2/2004 | Chong et al. | |

OTHER PUBLICATIONS http://en.wikipedia.org/wiki/Thread.*
Silberschatz et al., Applied Operating System Concepts, Published in 2000, John Wiley and Sons, Inc, First Edition, pp. 162-164.*
Fredman et al. "Fibonacci Heaps and Their Uses in Improved Network Optimization Algorithms" IEEE Proceedings Oct. 24, 1984, pp. 338-346.
Intermetrics Inc. "Implementation Module 1—Protected Records, Operator Visibility, Child Packages", ADA 95 Language Study Notes—ADA 95 Mapping/Revision Team, Feb. 1992, retrieved from http://archive.adaic.com/standards/95lsn/im-001.txt on Mar. 7, 2006.

(Continued)

*Primary Examiner*—William Thomson
*Assistant Examiner*—Qing-Yuan Wu

(57) ABSTRACT

Various implementations of the described subject associate a plurality of threads that are sorted based on thread priority with a run queue in a deterministic amount of time. The run queue includes a first plurality of threads, which are sorted based on thread priority. The second plurality of threads is associated with the run queue in a bounded, or deterministic amount of time that is independent of the number of threads in the associated second plurality. Thus, the various implementations of the described subject matter allow an operating system to schedule other threads for execution within deterministic/predetermined time parameters.

14 Claims, 14 Drawing Sheets

OTHER PUBLICATIONS

Silberschatz et al. "Operating System Concepts—Fourth Edition" Jan. 1994, pp. 97-115,131-133,140-147.

Sridhar et al. "Probabilistic data structures for priority queues" Algorithm Theory—SWAT '98. 6th Scandinavian workshop on Algorithm Theory. Proceedings Springer-Veralg Berlin, Germany, Jul. 1998, pp. 143-154.

Vuillemin J. "A data structure for manipulating priority queues", Communications of the ACM USA, vol. 21, No. 4 Apr. 1978. pp. 309-315.

EPO Communication with Search Report dated Mar. 27, 2006, from counterpart EP patent application, European Patent Application No. 02010606.8, copy attached, 3 pages.

* cited by examiner

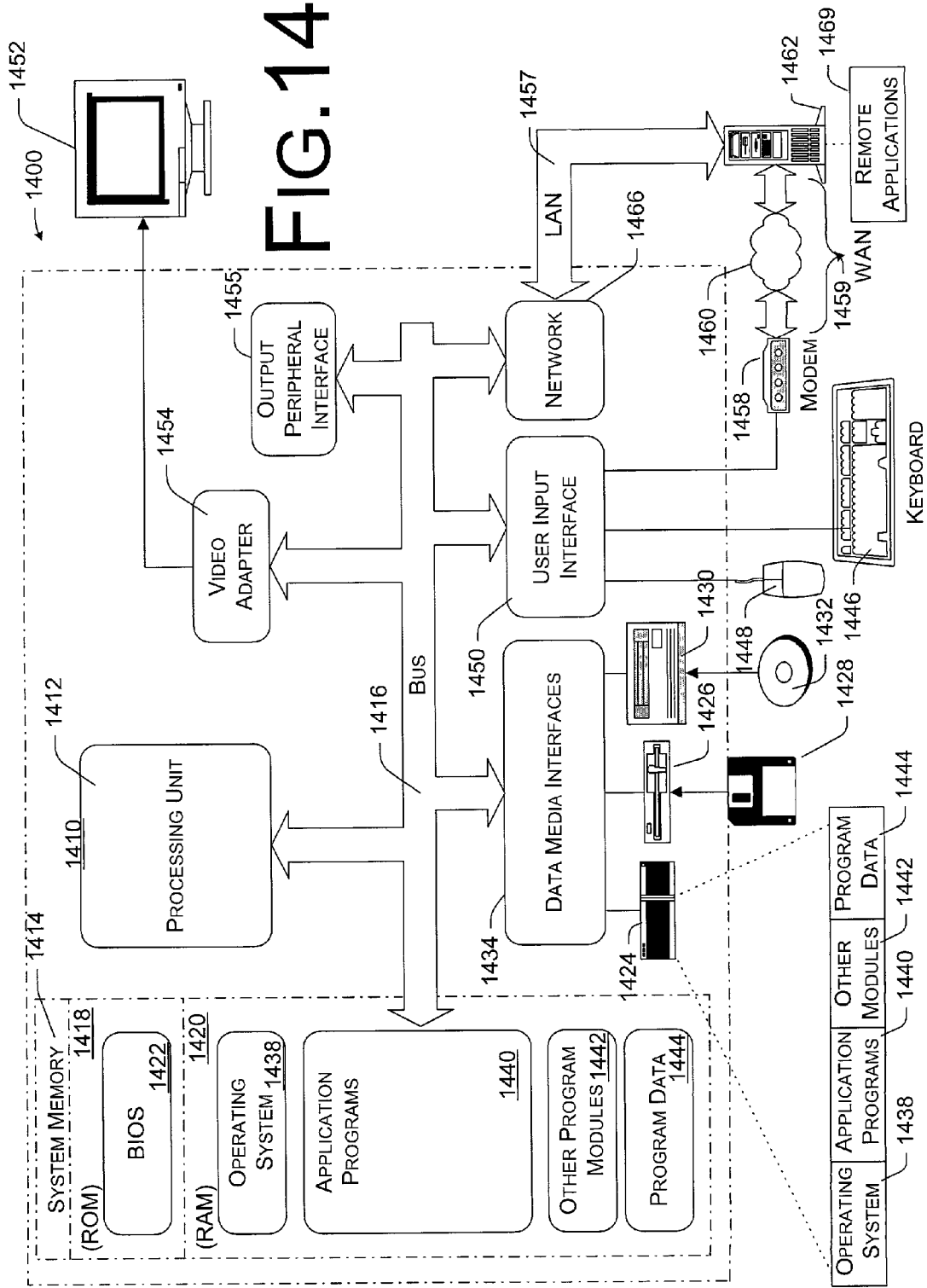

SYSTEMS AND METHODS FOR MANAGING A RUN QUEUE

RELATED APPLICATIONS

This patent application is related to U.S. patent application Ser. No. 09/884,374, filed on Jun. 18, 2001, titled "Sleep Queue Management", commonly owned hereby, and incorporated by reference.

TECHNICAL FIELD

The following description relates to time-deterministic run queue management.

BACKGROUND

Real-time performance is essential for time-critical responses required in high-performance embedded applications such as telecommunications switching equipment, medical monitoring equipment, space navigation and guidance applications, and the like. Such applications must deliver responses within specified time parameters in real-time.

Real-time performance is provided by operating systems that use thread-scheduling mechanisms to schedule threads for execution on a thread priority basis. (A thread is basically a path of execution through a computer program application). For example, the Microsoft WINDOWS CE® operating system provides two-hundred-fifty-six (256) thread priority levels, wherein threads of higher priority are executed before threads of lower priority are executed. Threads of equal priority are executed in a first-in-first-out round-robin fashion. For example, thread A runs, then thread B runs, followed by thread C, and back to thread A.

Thread scheduling mechanisms typically store threads in a "run queue" for subsequent execution. FIG. 1 illustrates a traditional run queue 100 that is implemented as a linked list. The threads 102 in the run queue are sorted based on respective thread priorities. For example, Threads 102-A1 through 102-AJ have respective thread priorities of zero (0), threads 102-B1 through 102-BK have respective thread priorities of one (1), and the like. There can be any number of threads 102 in the run queue.

A thread that is currently executing may be preempted by another thread, or the thread itself may "yield" its access to the processor. Both of these terms refer to the thread being placed into a "non-executing" state For example, an operating system may put a thread to sleep, or preempt the thread to allow a different thread with a higher priority to execute. In another example, the thread itself may "yield" its access to the processor to wait for the occurrence of a particular event such as the elapse of a predetermined amount of time, or the like, before continuing execution.

Regardless of whether a thread is preempted by another program or whether the thread itself yields its access to the processor, the system's thread scheduling mechanism typically stores the preempted, or yielding thread into a run queue or sleep queue. (More particularly, a reference to the thread is generally stored in the run queue or sleep queue). (Although the thread scheduling mechanism may or may not be part of the operating system, the terms thread scheduling mechanism, operating system, and the like, are often used interchangeably in this description to describe a system's thread scheduling aspects). When a thread's specified sleep time has expired, the scheduling mechanism "wakes-up" the thread by removing the thread from the sleep queue and inserting the thread into the run queue for subsequent execution.

FIG. 2 illustrates a traditional single-dimension sleep queue 200 that is implemented as a linked list. (A traditional sleep queue may also be implemented as a "heap" data structure). For purposes of this description, a sleep queue 200 is any queue for storing any number of threads that are sorted based on time. In this example, the threads 202 in the sleep queue are sorted in a single dimension based on thread wake-up time and thread priority within a particular wake-up time. For example, thread 202-1 has a wake-up time of five (5) milliseconds (ms) and threads 202-2 and 202-3 have respective wake-up times of ten (10) milliseconds. Threads that have the same sleep time are sorted based on priority in a round robin fashion. For example, thread 202-2 has a wake-up time of 10 ms with a thread priority of 0 (in this example, the highest thread priority), and thread 202-... has a wake-up time of 10 ms with a thread priority of 5 (a lower priority than a thread priority of 0). In this manner, the threads in the traditional sleep queue are sorted with respect to one-another in a single dimension.

As discussed above, a thread may be preempted by another thread for any number of reasons. One significant reason that a thread may be preempted is so that the operating system, or thread scheduling mechanism can determine if there are any threads of higher priority that need to be executed. Part of this determination, and another significant reason in and of itself, is the operating system may scan the threads stored/referenced in the sleep queue to determine if any need to be woken-up for execution (e.g., inserted into the run queue). Real-time operating systems typically preempt all other threads from executing at predetermined periodic time intervals to perform such thread management.

Thread scheduling mechanisms typically use a hardware timer to produce a system tick to determine a maximum amount of time, or "quantum" that a thread can execute in the system without being preempted. A system tick is a rate at which a hardware timer interrupt is generated and serviced by an operating system. When the timer fires, the thread scheduling mechanism will schedule a new thread for execution if one is ready.

Significantly, an operating system requires exclusive access to a processor during certain thread scheduling procedures such as during sleep queue thread removal procedures and during run queue thread insertion procedures. The operating system uses its system-exclusive access: (a) to remove threads from the sleep queue at or as close as possible to each respective thread's specified wake-up time for subsequent insertion into the run queue; and, (b) to insert each thread removed from the sleep queue into the run queue for execution.

The number of threads to be woken-up at any one time could be any number of threads such as one thread, two threads, or one hundred threads. The more threads that need to be removed from the sleep queue for insertion into the run queue, the greater the amount time is that an operating system requires system-exclusive access to the processor. This system-exclusive access is directly controlled by the operating system and cannot typically be preempted by any other thread.

The non-deterministic and non-preemptable nature of traditional sleep queue thread removal and run queue thread insertion procedures creates a number of significant problems. One problem, for example, is that operating system response cannot typically be guaranteed within predetermined time parameters because of such non-deterministic thread management techniques. This means that a pre-empted thread (a thread that was executed but that was blocked during sleep queue thread removal) won't execute again for an unknown amount of time. The respective wake-up times of one or all of the threads that that need to be removed from a sleep queue at any one moment in time may have already long passed before they are removed and inserted into the run queue. Analogously, by the time a thread that is inserted into the run queue gets executed, the thread's purpose or the event that the thread is responding to may have passed long ago.

Accordingly, traditional sleep queue thread removal and run queue thread insertion procedures do not typically allow an operating system to schedule other threads for execution within deterministic/predetermined time parameters.

SUMMARY

A run queue includes a first plurality of threads that are sorted based on thread priority. A second plurality of threads that are also sorted with respect to thread priority is associated with the run queue in a deterministic amount of time that is independent of the number of threads in the associated second plurality. Thus, the various implementations of the described subject matter allow an operating system to schedule other threads for execution within deterministic/predetermined time parameters.

BRIEF DESCRIPTION OF THE DRAWINGS

FIG. 7 illustrates use of a last examined thread to identify a start position in a multi-dimensional sleep queue to begin a search for a new thread insertion point.

FIG. 8 shows how a last examined node may be used to identify an insertion point in the sleep queue based on the last examined node's wake-up time and priority.

FIG. 9 shows how a last examined node is used to identify an insertion point in the sleep queue when the last examined thread is the last thread in one of the multiple dimensions.

FIG. 14 is block diagram that shows aspects of a suitable computing environment wherein an exemplary system and procedure to manage a run queue may be implemented.

DETAILED DESCRIPTION

The following description sets forth various implementations of subject matter to manage a run queue that incorporates elements recited in the appended claims. The implementations are described with specificity in order to meet statutory requirements. However, the description itself is not intended to limit the scope of this patent. Rather, the inventor has contemplated that the claimed subject matter might also be embodied in other ways, to include different elements or combinations of elements similar to the ones described in this document, in conjunction with other present or future technologies.

Exemplary Multi-Dimensional Sleep Queue

Figure 3:
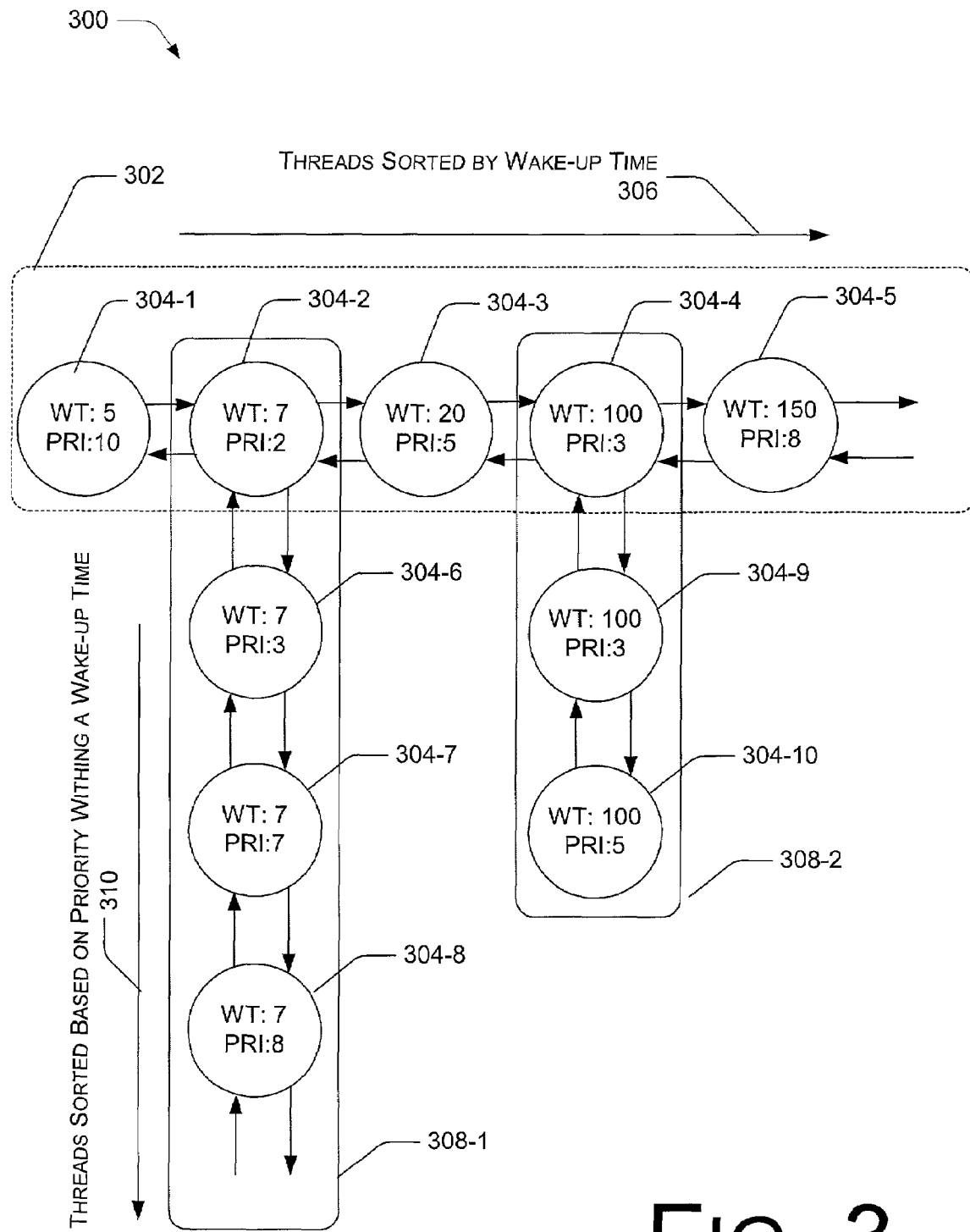
FIG. 3 is a block diagram that shows an exemplary multi-dimensional sleep queue that is used by a thread scheduling mechanism to allow an operating system to schedule other threads for execution within deterministic/predetermined time parameters.

FIG. 3 is a block diagram that shows an exemplary two-dimensional (2-D) sleep queue 300. Sleep queue 300 is used to keep track of threads that are no longer executing for a specified amount of time, or "put to sleep". When a thread is interrupted and put to sleep, a reference to that thread is inserted in the sleep queue. Each thread has parameters that are used to determine when it should be taken out of the sleep queue and therefore "resumed". In this implementation, these parameters include a wake-up time and a thread priority.

For example, within the sleep queue 300, each thread is represented as a node or data field 304. Thus, the sleep queue comprises a plurality of such nodes or data fields. Each node represents a respective thread of execution in a computer program application. Each node comprises a respective thread wake-up time and a respective thread priority ("PRI"). For example, node 304-1 includes a thread WT of five (5) milliseconds (ms), and a thread PRI of ten (10). (In this implementation, a thread PRI of 0 is a higher thread PRI than one (1), which in turn is a higher thread PRI than two (2), and the like).

For purposes of removing a group of threads from the sleep queue 300 in a deterministic amount of time, the nodes 304 are sorted in two dimensions: first with respect to their wake-up times and then with respect to their thread priorities. FIG. 3 shows the results of such sorting, in which nodes are sorted left-to-right in order of increasing wake-up time values and top-to-bottom in order of increasing PRI values. This produces a two-dimensional array having a number of columns equal to the number of unique wake-up time values possessed by the nodes contained in the sleep queue. Each column contains all nodes having a particular wake-up time value. The columns are sorted in order of increasing wake-up time values. Within each column, the nodes are sorted in order of their PRI values.

For example, a first-dimension row or data field 302 includes nodes 304-1 through 304-5, having the lowest-priority node of each unique wake-up time value, sorted in order of increasing wake-up time value. Node 304-1 has a thread wake-up time of 5, node 304-2 has a thread wake-up time of 7, node 304-3 has a thread wake-up time of 20, and the like. Each node is ordered in the first dimension such that a thread that is ready to be "woken-up" is removed by a sleep queue management procedure before the procedure removes a thread whose "wake-up" time has not arrived. There can be any number of nodes in the first dimension data field. Each node 304 in the first dimension 302 has a different thread wake-up time as compared to other nodes in the first dimension. First dimension nodes are not ordered, or sorted with respect to one-another based on thread priority.

The sorting also results in a plurality of second-dimension columns or data fields 308, wherein nodes 304 are ordered with respect to one-another based on the their respective thread PRIs. For example, a second subset of the nodes is represented by second dimension data field 308, which in this example comprises nodes 304-2 through 304-8. There can be any number of nodes in the second dimension data field. Moreover, there can be any number of second dimension data fields. To illustrate this, consider that there is a second dimension data field 308-2, which comprises nodes 304-4 through 304-10.

Each node 304 represents not only a node in the first dimension 302, but also represents a respective node in a second dimension 308. In other words, each second dimension data field includes a single first dimension node. For example, second dimension 308-1 includes node 304-1, which is in both the first dimension and the second dimension. In yet another example, second dimension 308-2 includes node 304-4, which is sorted with respect to both the first dimension and the second dimension.

As illustrated by directional arrow 310, each node 304 in a second dimension 308 is sorted with respect to each other node in the second dimension based on thread PRI within a particular thread wake-up time. For example, node 304-2 has a thread PRI of two (2), which is higher than node's 304-6 respective thread priority of three (3), and the like. In contrast to the nodes 304 in the first dimension 302, wherein each node has a different thread wake-up time, each second dimension node has a same respective thread wake-up time. For example, each node 304-2 through 304-8 has the same thread wake-up time of seven (7) ms. Because each node 304 of the sleep queue 300 is sorted with respect to first and second dimensions, each node with a highest/higher priority in the first dimension 302 as compared to respective priorities of other nodes with a similar wake-up time is considered to be in a "primary position" with respect to the first and second 308 dimensions of the sleep queue. For example, referring to FIG. 3, nodes 304-1 through 304-5 can be considered to be in a "primary" position with respect to the first and second dimensions of the sleep queue.

Furthermore, a node with a lower priority as compared to one or more other nodes with a similar wake-up time, is considered to be in a secondary position with respect to the first and second dimensions of the sleep queue. For example, node 304-6 has a priority of 3, which in this example is lower than node's 304-2 priority of 2. (Note that each node has a similar wake-up time of 7 ms). Thus, node 304-2 is considered to be in a secondary position with respect to the first and second dimensions of the sleep queue.

To indicate sorted relationships between nodes, the nodes are advantageously maintained in linked lists. Specifically, nodes 304 may include one or more references to other nodes 304. For example, a first thread 304-1 includes a reference (not shown) such as a pointer reference to a next thread 304-2, which in turn comprises a reference to a subsequent thread 304-3. In yet another example, node 304-2 includes at least two such node references, a first reference to node 304-6 and a second reference to 304-3.

There are many ways of managing such node 304 references. For example, if a node does not currently reference a different node, a pointer reference in the node may be set to equal a null value. If during sleep queue management procedures the multi-dimensional sleep queue configuration changes to include more or less threads/nodes, a node's corresponding pointer reference can be set accordingly to accurately reflect such changes.

This multi-dimensional arrangement of the sleep queue 300 makes it easy to determine the next thread to be resumed or group of threads to be removed from the sleep queue. In this example, the next thread to be removed is the thread with the earliest wake-up time and highest thread priority— node 304-1 at the top left. Furthermore, this arrangement has several other advantages relating to removing groups of threads from the sleep queue in a deterministic amount of time. For example, when the sleep queue 300 is implemented as a linked list, a single node (e.g. node 304) detach operation is used to remove one or more nodes in the first 302 and second dimensions 308 on a system timer tick.

To illustrate this, consider that a detach of node 304-2 from the multidimensional sleep queue results in the removal of a group of nodes (i.e., node 304-2, and nodes 304-6 through 304-8) in second dimension data field 308-1. Thus, each of the nodes in a second dimension data field, regardless of the number of nodes in the second dimension data field, is removed from the sleep queue at the same time.

Accordingly, the amount of time it takes to remove any number of nodes with a particular wake-up time is based on the amount of time it takes to detach a single node from the sleep queue. Thus, the multi-dimensional sleep queue provides for removing a group of nodes from the sleep queue in a bounded, or determinative amount of time. As described below, this group of nodes can be associated with the run queue in the amount of time that it takes to insert a single node into the run queue. Thus, sleep queue 300 allows an operating system to schedule other threads for execution within deterministic/predetermined time parameters.

Exemplary Procedure to Manage a Multi-Dimensional Sleep Queue

Figure 1:
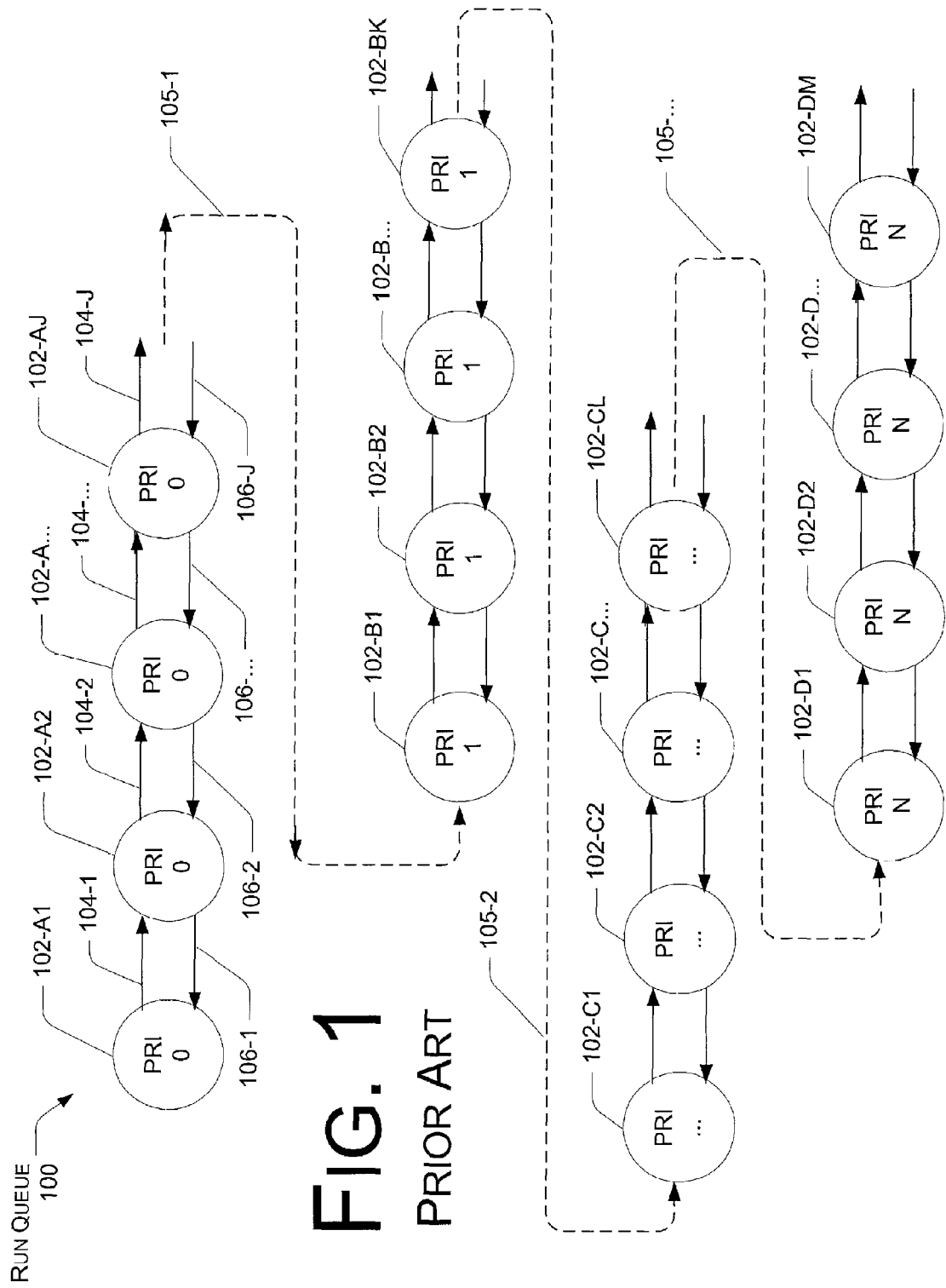
FIG. 1 is a block diagram that illustrates aspects of a traditional run queue used by an operating system to schedule threads for execution.
Figure 2:
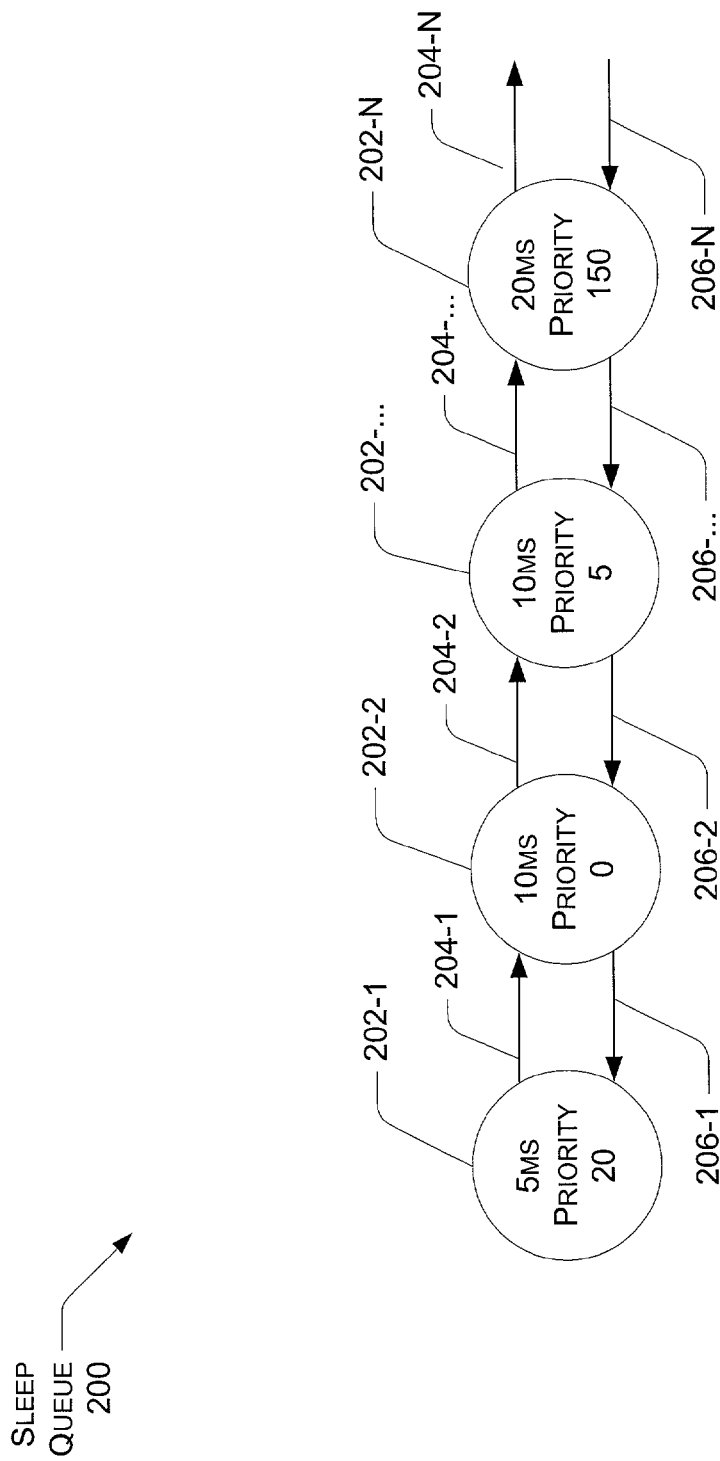
FIG. 2 is a block diagram that illustrates aspects of a traditional thread sleep queue used by an operating system to allow threads to sleep for a specified amount of time before execution is resumed.

Conventional techniques to insert threads into a single dimension sleep queue of FIG. 2 typically allow other processes/threads to execute during the sleep queue thread insertion process. This allows an operating system to schedule other threads for execution within predetermined time parameters during the sleep queue thread insertion process.

(This is the case even though the entire amount of time that it takes to insert a thread into the sleep queue may be non-deterministic, or unbounded (undeterminable)). However, such conventional single dimension sleep queue thread insertion techniques are not designed to insert a thread into the inventive multi-dimensional sleep queue 300 of FIG. 3.

Figure 4:
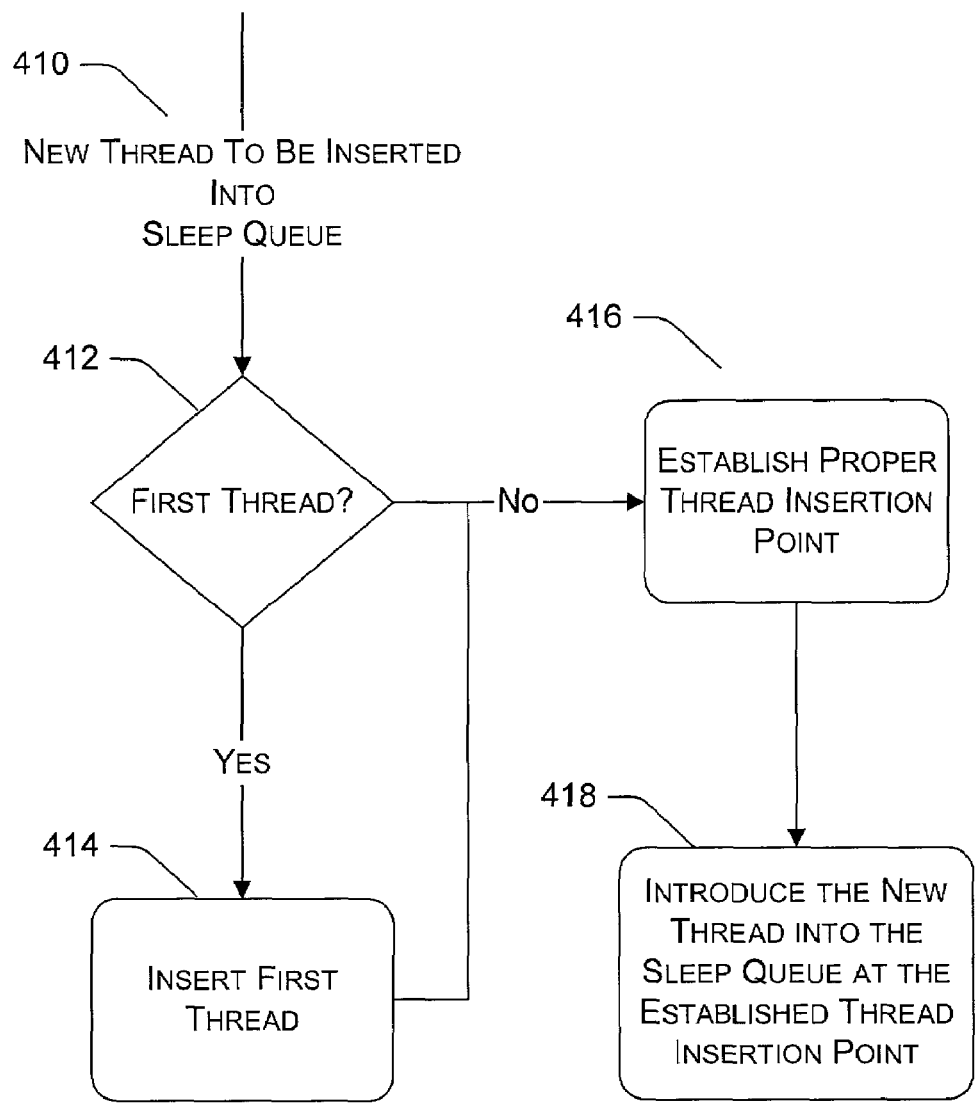
FIG. 4 is a flowchart that illustrates an exemplary procedure to insert a thread into a multi-dimensional sleep queue, such that multiple threads that have a same thread wake-up time can be removed from the sleep queue in a deterministic amount of time.

FIG. 4 is a flowchart that shows an exemplary procedure 400 to insert a thread into a multi-dimensional sleep queue 300 of FIG. 3. The procedure inserts threads into the multi-dimensional sleep queue such that multiple threads having a same thread wake-up time can be removed from the sleep queue in a determinative amount of time, and also such that the wake-time and priority sorted semantics of the multi-dimensional sleep queue are preserved.

At block 410, the procedure receives a new thread of execution to be inserted into a multi-dimensional sleep queue for a predetermined, thread specified amount of time. (See, the sleep queue 300 of FIG. 3). At some point in time, no threads may be stored in the sleep queue. Thus, at block 412, the procedure determines if the new thread will be the first thread in the sleep queue. If not, the procedure continues at block 416, which is described in greater detail below. If so, at 414, the procedure inserts the new thread into the sleep queue as a first thread, or "head node" of the sleep queue.

At block 416, the procedure 400 having already determined that the new thread is not the first thread in the sleep queue (block 412), the procedure establishes a thread insertion point in the multi-dimensional sleep queue for the new thread. The thread insertion point is based on the new thread's specific wakeup time and priority, as compared to the respective wake-up times and priorities of threads that are already in the sleep queue. (Exemplary aspects to establish a proper thread insertion point are described in greater detail below in reference to FIGS. 5 through 9). At block 418, the procedure introduces the new thread into the sleep queue at the established insertion point.

Figure 5:
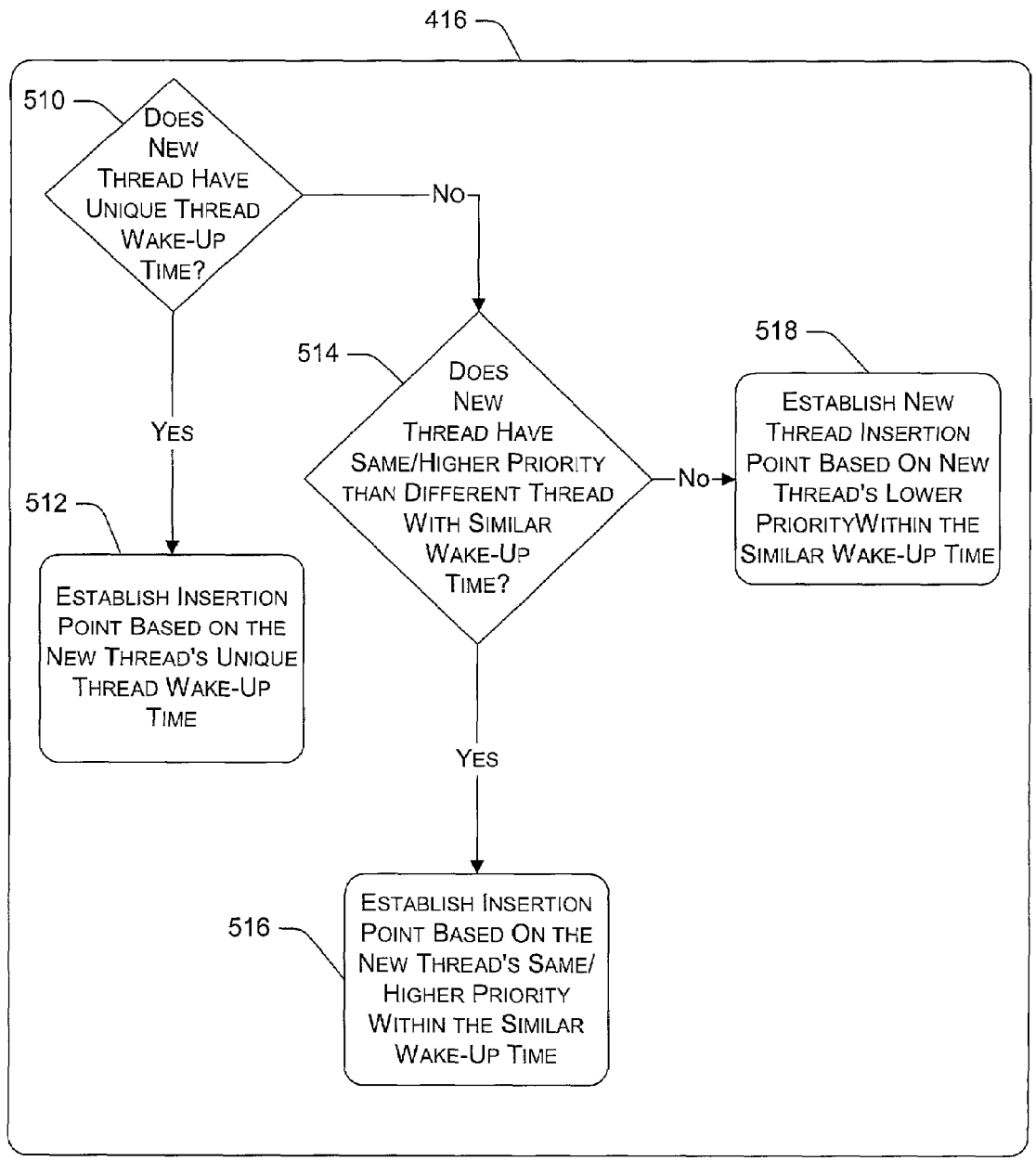
FIG. 5 is a flowchart that shows an exemplary procedure to determine/establish a thread insertion point in a multi-dimensional sleep queue in a manner that allows an operating system to schedule other threads for execution within deterministic time parameters.

FIG. 5 is a flowchart that illustrates an exemplary block 416 of the procedure of FIG. 4 to establish an insertion point in a multi-dimensional sleep queue. At block 510, the procedure determines if the new thread's specified wakeup time is different as compared to each respective wake-up time of each of the other threads in a first dimension of the multi-dimensional sleep queue. At block 512, it having been determined that the new thread's wake-up time is unique in the first dimension (block 510), the procedure sets the insertion point for the new thread such that it is sorted into the first dimension (see data field 302 of FIG. 3) based on its unique wake-up time.

At block 514, having already determined that a different thread in the first dimension has a same wake-up time as the new thread wake-up time (block 510), the procedure 400 determines whether the new thread's priority is the same or higher than a thread priority that corresponds to the different thread with the same wake-up time.

At block 516, it having been determined that the new thread has a same or higher priority as compared to the different thread (block 514), the procedure establishes the insertion point within a second dimension of threads having a similar wake-up time. If thread priorities are the same, the new thread insert point is immediately before or after the different thread. In this implementation, if the new thread's priority is higher or the same as the different thread's priority, the insert point is immediately before the different thread.

At block 518, having already determined that a different thread in the first dimension has a same wake-up time as the new thread wake-up time (block 510), and having already determined that the new thread does not have a same or higher priority than the different thread (block 514), the procedure 400 establishes the insert point based on the new thread's lower priority within a second dimension of nodes with the same wake-up time.

Figure 6:
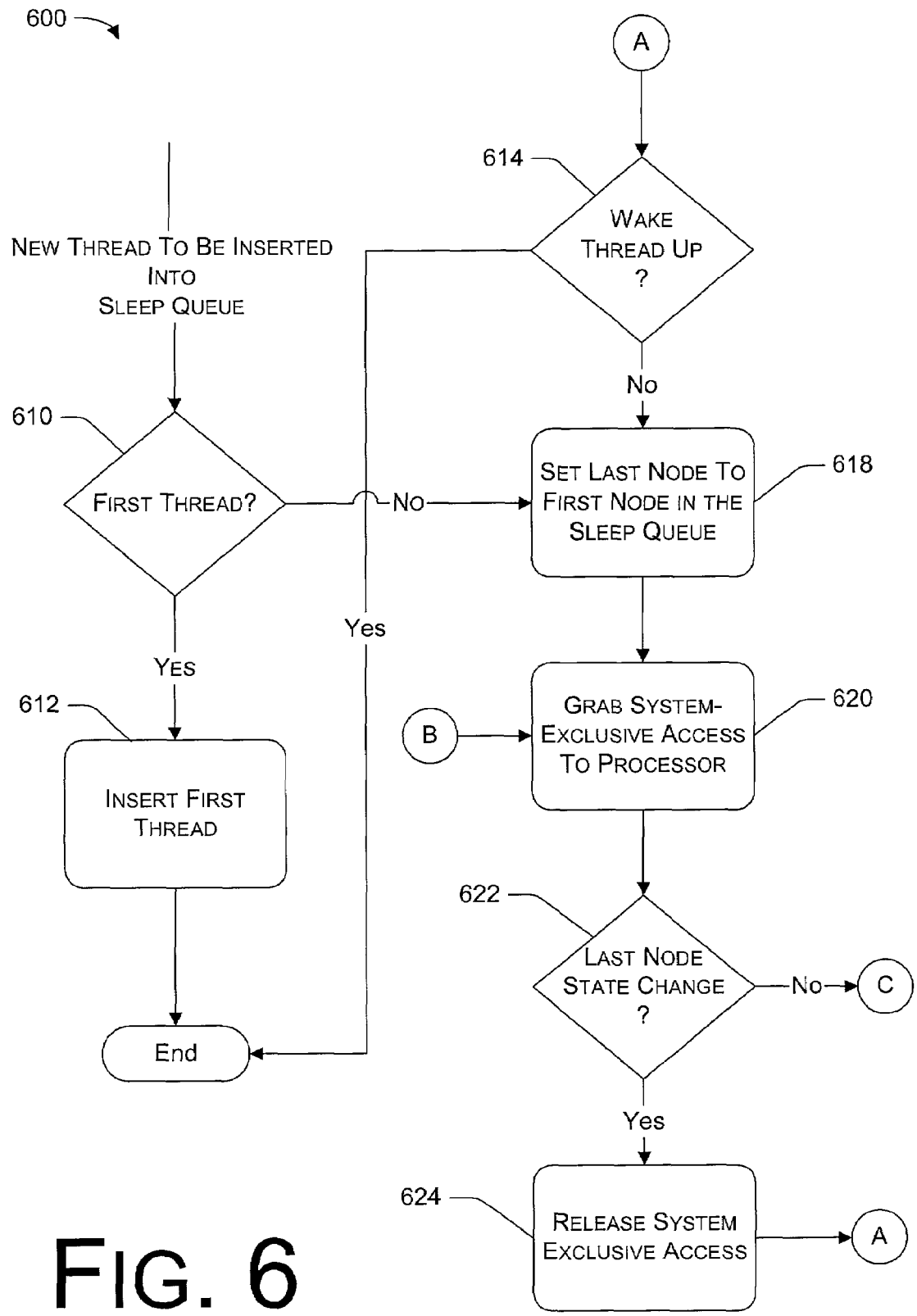
FIG. 6 is a flowchart illustrating further aspects of an exemplary optimized procedure to insert a thread into a multi-dimensional sleep queue. Specifically, the optimized procedure uses a multi-dimensional atomic walk procedure to identify a position in a multi-dimensional sleep queue to insert the thread.

FIG. 6 is a flowchart that illustrates an exemplary optimized procedure to insert a new thread into a multi-dimensional sleep queue 300 of FIG. 3. More particularly, this implementation uses a multi-dimensional atomic walk to locate a proper insertion point in the multi-dimensional sleep queue for a new thread. The multi-dimensional atomic walk either starts searching for an insertion point at a first thread (if there is one), or at a last examined node in the sleep queue.

If a status of a last examined node 302 has changed, the search will begin at the start of the sleep queue. Such a change of node status comprises a determination of whether the last examined node was already removed from the sleep queue since it was last examined, or whether the last examined node was moved from a primary position with respect to the first and second dimensions of the sleep queue to a secondary position. (Primary and secondary positions with respect to the first and second dimensions of the sleep queue are discussed in greater detail above in reference to FIG. 3). As long the status of the last examined thread has not changed, it is valid to begin the examination of threads in the sleep queue with the last examined thread.

The search for the thread insertion point is performed on a thread-by-thread, or "node-by-node" basis. A node-by-node basis means that an operating system maintains system-exclusive access to a processor only for that amount of time that is required to examine a single node to determine if the examined node identifies a new thread's appropriate insertion point in a multi-dimensional sleep queue. After a single node is examined, the operating system releases the system-exclusive access to the processor. If yet another node needs to be examined to identify the insert point for the new thread, then the operating system again grabs system-exclusive access to the processor to examine a next thread/node (if any). In this manner, in-between single node examinations, the operating system allows the processor to execute threads that were preempted to allow the operating system to perform the sleep queue scheduling mechanism. An optimized multidimensional atomic walk thread insertion procedure 600 is now described.

At block 610 the procedure 600 determines if a new thread that is to be inserted into the multi-dimensional sleep queue is a first thread. If so, at block 612 the procedure inserts the first thread into the sleep queue.

If the new thread is determined not to be the first thread (block 610), at block 618, the procedure sets a last examined node/thread to reference, the inserted first node (block 612). At block 620, the procedure preempts all other threads from executing by grabbing system-exclusive access to the processor.

At block 622, the procedure 600 determines if a state of the last node has changed. As discussed above, the last node's state changes if it has already been removed from the sleep queue (e.g., already inserted into the run queue for execution), or if the last node was moved from a primary position with respect to the first and second dimensions of the sleep queue to a secondary position.

Figure 7:
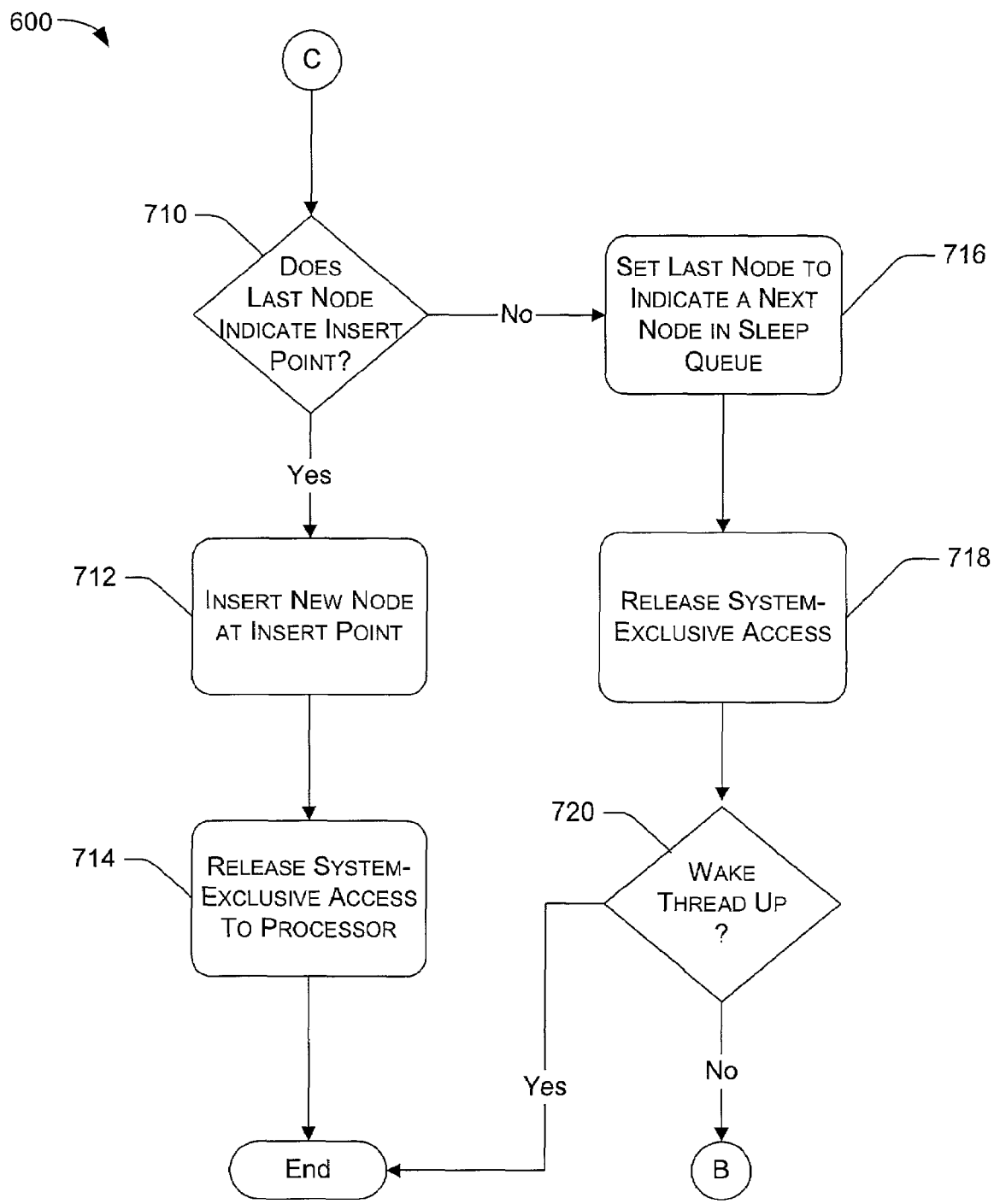
FIG. 7 is a flowchart that shows further aspects of an exemplary multidimensional atomic walk procedure to identify a position in a multi-dimensional sleep queue to insert a thread. Specifically.

If the state of the last node has not changed (block 622), the procedure 600 continues at block 710 as shown in FIG. 7, which is described in greater detail below. However, if the state has changed, at block 624, the operating system releases the system-exclusive access to the processor (see, block 620). The procedure continues at block 614, wherein the procedure determines if it is time for a thread to be woken-up from the sleep queue. If so, the procedure ends. Otherwise, the procedure continues as described above in reference to block 618.

FIG. 7 is a flowchart that shows further aspects of an exemplary procedure 600 to insert a new thread into a multi-dimensional sleep queue to. At block 710, the procedure determines if the last examined node/thread indicates an insertion point in the sleep queue. (An exemplary methodology of block 710 to determine if the last node identifies an insertion point is described in greater detail below in reference to FIG. 8). If so, at block 712, the procedure inserts the new node/thread into the multi-dimensional sleep queue at the indicated insert point. At block 714, the procedure releases system-exclusive access to the processor (see, block 620 of FIG. 6).

At block 716, it having been determined that the last examined thread/node does not indicate an insertion point for the new thread in the sleep queue (block 710), the procedure 600 sets the last examined node/thread to indicate a next node in the sleep queue. At block 718, the procedure releases the system-exclusive access to the processor (see, block 620 of FIG. 6). At block 720, the procedure determines if a thread needs to be woken-up from the sleep queue. If so, the procedure ends. Otherwise, the procedure continues at block 620 of FIG. 6, which is described in greater detail above.

Figure 8:
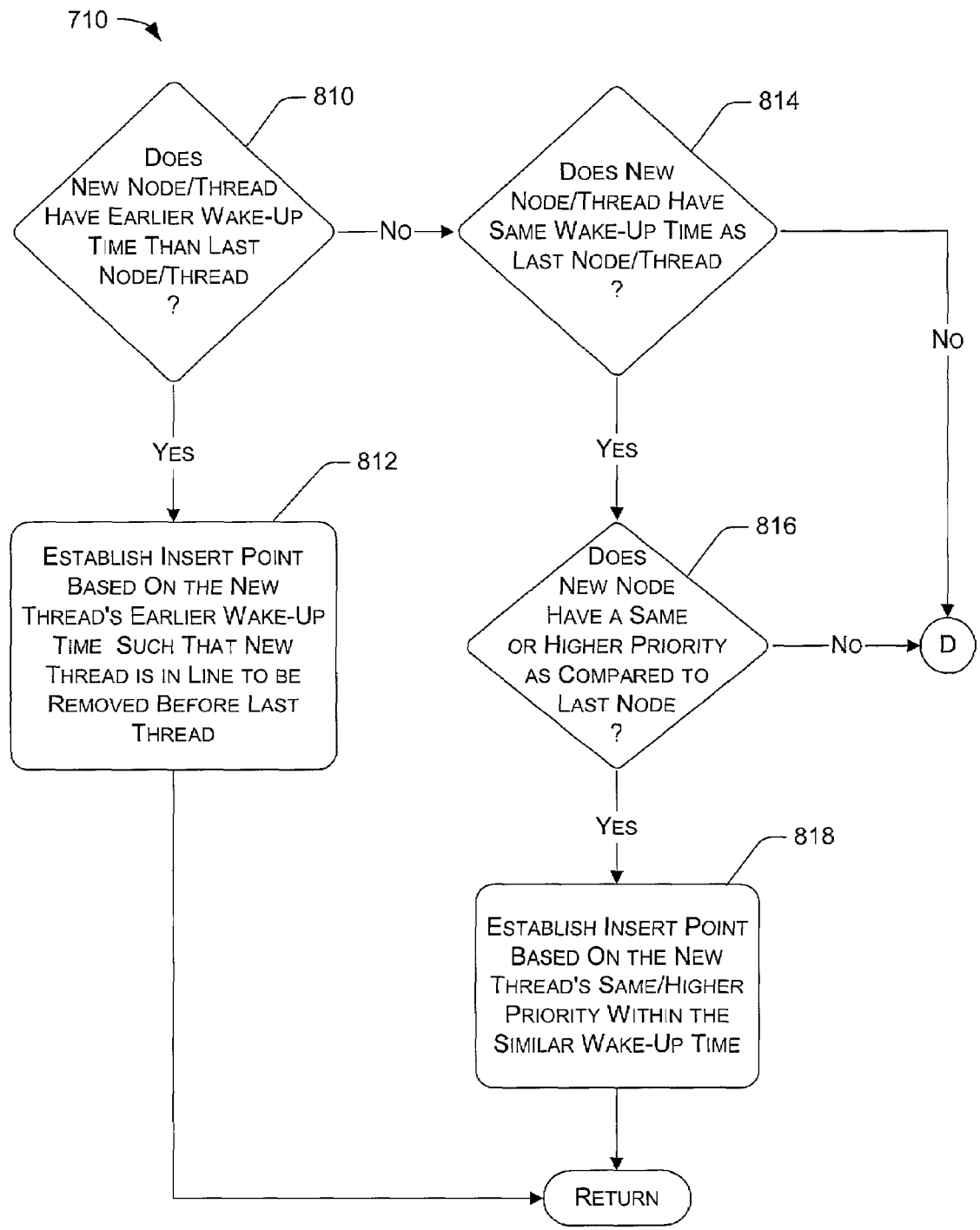
FIG. 8 is a flowchart that shows further aspects of a multi-dimensional atomic walk procedure to insert a new thread into a multi-dimensional sleep queue. In particular

FIG. 8 is a flowchart that shows further aspect of a multi-dimensional atomic walk procedure to insert a new thread into a multi-dimensional sleep queue. In particular it shows how a last examined node may identify an insertion point in the sleep queue. (See, block 710 of FIG. 7). At block 810, the procedure determines if the new node/thread has an earlier wake-up time as compared to the last examined node/thread. If so, the insert point is established based on the new thread's earlier WT, such that the new thread will be removed from the sleep queue before the last examined thread.

At block 814, the procedure 600 determines if the new node/thread has a same wake-up time as compared to the last examined node/thread. If not, the procedure continues at block 910 of FIG. 9, which is described in greater detail below. However, if the new node/thread has a same wake-up time as compared to the last examined node/thread, at block 816, the procedure determines if the new node/thread has a same or higher priority as compared to the priority of the last examined node/thread. If not, the procedure continues at block 910 of FIG. 9, which is described in greater detail below.

If the new node/thread has a same wake-up time and a same or higher priority as compared to the last examined node/thread (block 816), at block 818, the procedure establishes the insert point based on the new thread's same or higher priority as compared to the priority of the last examined node/thread, and based on the similar wake-up time as the last examined node/thread. (Exemplary methodology to perform block 818 is described in greater detail above in reference to block 516 of FIG. 5).

Figure 9:
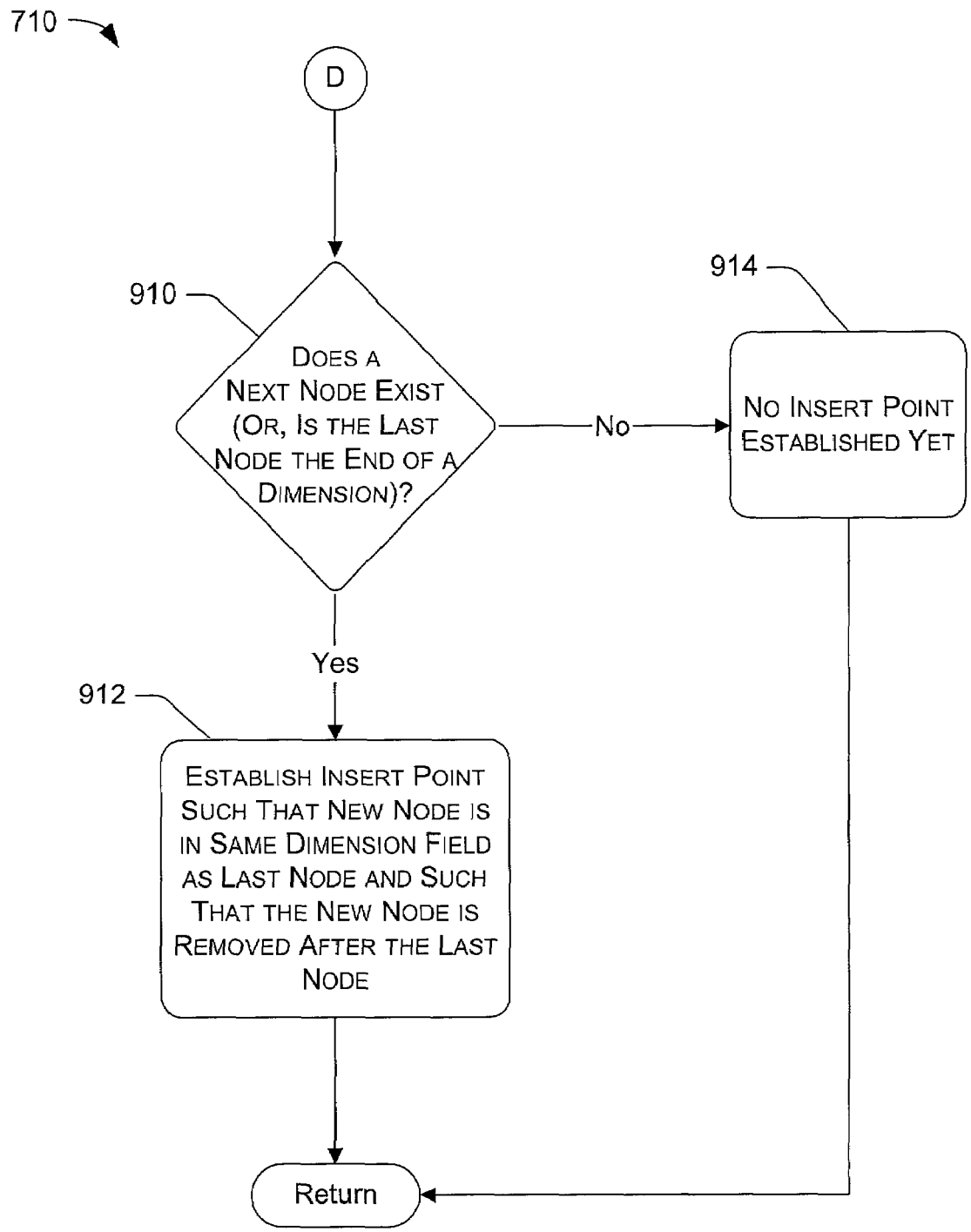
FIG. 9 is a flowchart that illustrates further aspects of an exemplary optimized procedure to insert a new thread into a multi-dimensional sleep queue. In particular.

FIG. 9 is a flowchart that shows further aspect of a multi-dimensional atomic walk procedure to insert a new thread into a multi-dimensional sleep queue. In particular it shows how a last examined node that is a last node in a dimension may identify an insertion point in the sleep queue for a new thread. (See, block 710 of FIG. 7, and block 816 of FIG. 8). At block 910, the procedure determines if the last examined node indicates a next node (or is it null) in a particular dimensional direction of interest to indicate whether there are any other next nodes in the primary or secondary dimensions of the multi-dimensional sleep queue.

If the last examined node has the same wake-up time as the new node (this was already determined at block 814 of FIG. 8), then it has also already been determined that the new node has a lower priority than the last node (see, block 816 of FIG. 8). Thus, the procedure determines at block 910 whether the last examined node indicates a next node with respect to a node with a lower priority in the second dimension (e.g., a next node with a secondary position with respect to the first and second dimensions).

If the last examined node does not have the same wake-up time as the new node (this was already determined at block 814 of FIG. 8), then it has also already been determined that the new thread/node has a later wake-up time as compared to the last node (see, block 810 of FIG. 8). Thus, the procedure determines at block 910 whether the last examined node indicates a next node with respect to a node with a later wake-up time than the last node in the first dimension (e.g., a next node with a primary position with respect to the first and second dimensions).

At block 912, it having been determined that the last node is the last node in a dimensional direction of interest, establishes the insert point for the new thread such that the new node is the last node in that dimensional direction of interest and such that it will be removed from the multi-dimensional sleep queue after the last examined node.

At block 914, the last node not being the last node in a dimensional direction of interest, the procedure indicates that the new thread's insert point in the multi-dimensional sleep queue is not yet determinable. The procedure continues at block 710 of FIG. 7 as described in greater detail above.

Time-Deterministic Group Thread Removal from a Sleep Queue

Figure 10:
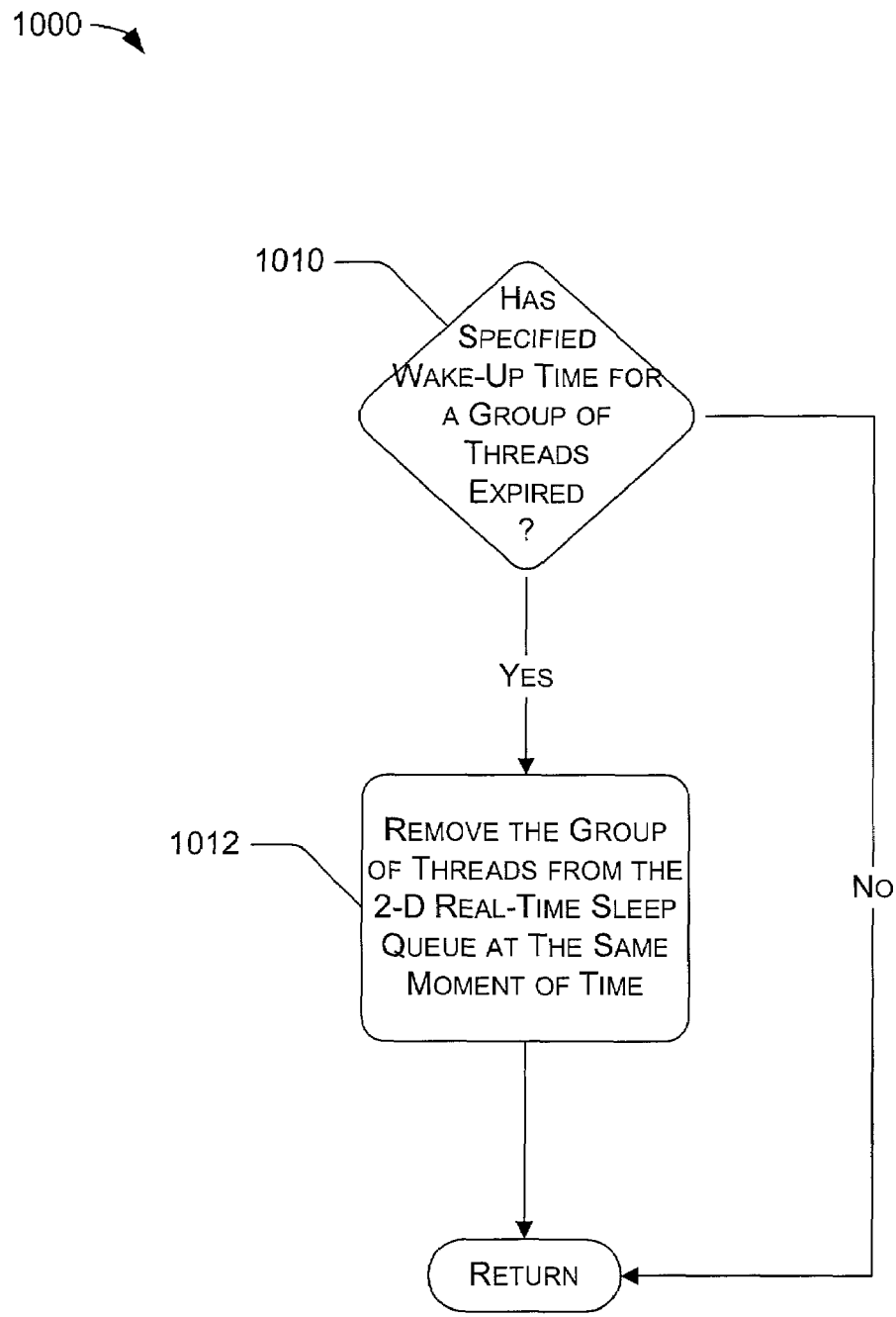
FIG. 10 is a flowchart that shows an exemplary procedure to remove a group of threads from a sleep queue in a deterministic amount of time that is independent of the number of threads that need to be removed.

FIG. 10 is a flowchart that shows an exemplary procedure 1000 to remove a group of threads from a sleep queue in a bounded, or deterministic amount of time. At block 1010, the procedure determines whether one or more respective thread specified wake-up times have expired. (A thread with an expired wake-up time must be removed from the sleep queue for subsequent insertion into a run queue for execution). At block 1012, having determined that one or more threads need to be removed from the sleep queue for insertion into the run queue (block 1010), the procedure removes the one or more threads from the sleep queue in the amount of time the processor takes to perform a single node detach operation. Thus, the group removal of threads from the multi-dimensional sleep queue is time-deterministic in nature.

Accordingly, the methodology shown in FIGS. 5-10 provide for the removal of multiple threads from a sleep queue in a deterministic amount of time. Moreover, as will be discussed in greater detail below in reference to FIGS. 11 and 12, the amount of time that it will take to associate the detached group of nodes with the run queue is also time-deterministic because it will only be that amount of time that it takes to associate a single node with the run queue. This is significant because any non-deterministic delay incurred by the operating system in providing program responses threatens the real-time aspects of a real-time operating system.

Exemplary Run Queue

Figure 11:
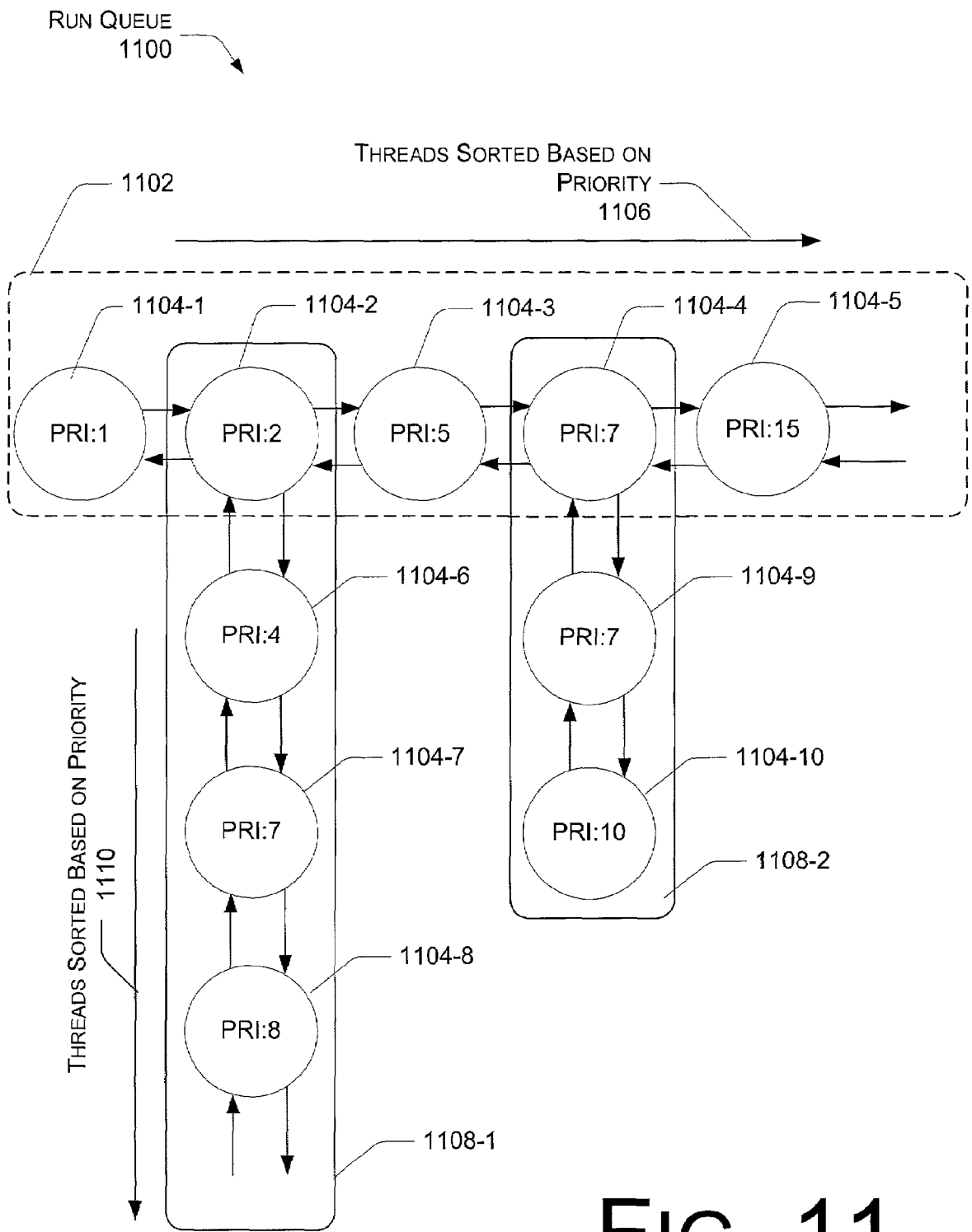
FIG. 11 is a block diagram that shows aspects of an exemplary run queue that allows a plurality of threads to be associated with the run queue in a deterministic amount of time.

FIG. 11 is a block diagram that shows aspects of an exemplary run queue 1100 for associating a group of nodes with the run queue in a deterministic amount of time. The run queue comprises a first data field 1102 includes a first plurality of threads 1104. Each thread 1104 includes a respective thread priority. Each thread 1104 in the first data field is sorted with respect to each other thread in the first data field based on a semantic. The semantic is that a thread with a high priority is removed from the run queue before a thread with a lower priority is removed from the run queue. For example, thread 1104-2 having a priority of two (2) is removed for execution before the thread 1104-3 having a priority of four (4) is removed for execution.

The run queue 1100 comprises one or more second data fields 1108 such as field 1108-1 and field 1108-2. A second data field comprises a second plurality of threads 1104. Each thread 1104 in the second data field is sorted with respect to each other thread in the second data field such that a thread with a high priority is removed from the second data filed before a thread with a lower priority is removed.

In this implementation an operating system obtains the secondary data field from the sleep queue 300 of FIG. 3. Such a sleep queue and procedures to remove the secondary data field 308 from the sleep queue in a deterministic amount of time is described in greater detail above in reference to data field 308 of FIGS. 3-10.

The second data field 1108, which corresponds to the data field 308 of FIG. 3, includes a root thread such as root thread 1104-2 or root thread 1104-4. A root thread includes a particular priority, and each of the other threads include a respective priority that is a lower priority or an equal priority as compared to the root thread's priority. For example, root thread 1104-2 has a priority of 2,each of the other priorities in the second data field 1108-1 have a respective priority that is less than 2.(In this example, a priority of zero (0) such as node 1104-2 is a highest priority, and a priority of fifteen (15) such as node 1104-5 is a lowest priority).

The entire second data field 1108 is associated with the first data field 1102 in response to a single operation such as a linked list insert node operation, whereupon the root node such as thread 1104-2 is inserted into the run queue 1100 first data field 1102. Linked list insert node operations are well known in the art of computer programming. Because the second data field is associated with the first data field in response to a single operation, the amount of time that it takes to associate any number of threads with the run queue is independent of a number of threads being associated with the run queue.

Moreover, because each thread in the data field 1108 is associated with the run queue in response to a single operation, the amount of time that it takes to associate any number of threads with the run queue is determinable in advance of performing the operation. A single operation may include one or more instructions each of which are determinable in advance. Because a processor typically requires a predetermined amount of time to execute any one particular instruction, the amount of time to execute the operation to associate the group of threads with the run queue is deterministic. Because the amount of time is deterministic, it is also often referred to as being "bounded" since one can specify a boundary limit to the amount of time in advance.

Only those threads 1104 that are in the first data field's queue 1102 will be removed for execution. A thread of a higher priority will always be removed from the first data queue for execution before a thread of a lower priority is removed from the first data queue for execution. And, threads of equal priority run in a first-in-first-out round-robin fashion. Note that a root thread such a thread 1104-2 and/or a thread 1104-4 is part of both a first data queue and a respective second data queue 1108.

In this implementation, it is only after a root node has been removed for execution, that a next node coupled to the removed root node is inserted into the first data queue for subsequent removal and execution. For example, only after the root node 1104-2 has been removed for execution, is the next node 1104-6 inserted into the first data queue for subsequent removal and execution. The next node is inserted such that it maintains the priority sorting of the first data queue. In this example, the next node has a priority of four (4), thus it would be inserted into the first queue such that it will be removed for execution before node 1104-3 is removed for execution. However, had the next node had a lower priority than node 1104-3 (such as a priority of 20), the next node would be inserted into the first queue such that it would not be removed for execution until after the node 1104-5 is removed for execution. More particularly, the next node is inserted into the first queue such that it is not removed from the first data queue until after nodes 1104-3 through 1104-5 have been removed for execution.

In this manner, after a root node such as thread 1104-2 and/or thread 1104-4 is removed from the first data queue 1102, a next node (if there is one) such as node 1104-6 and/or node 1104-9, in effect, becomes a root node of a respective second data queue 1108. This is because the next node effectively becomes the queue's head node.

Exemplary Procedure to Manage a Run Queue

Figure 12:
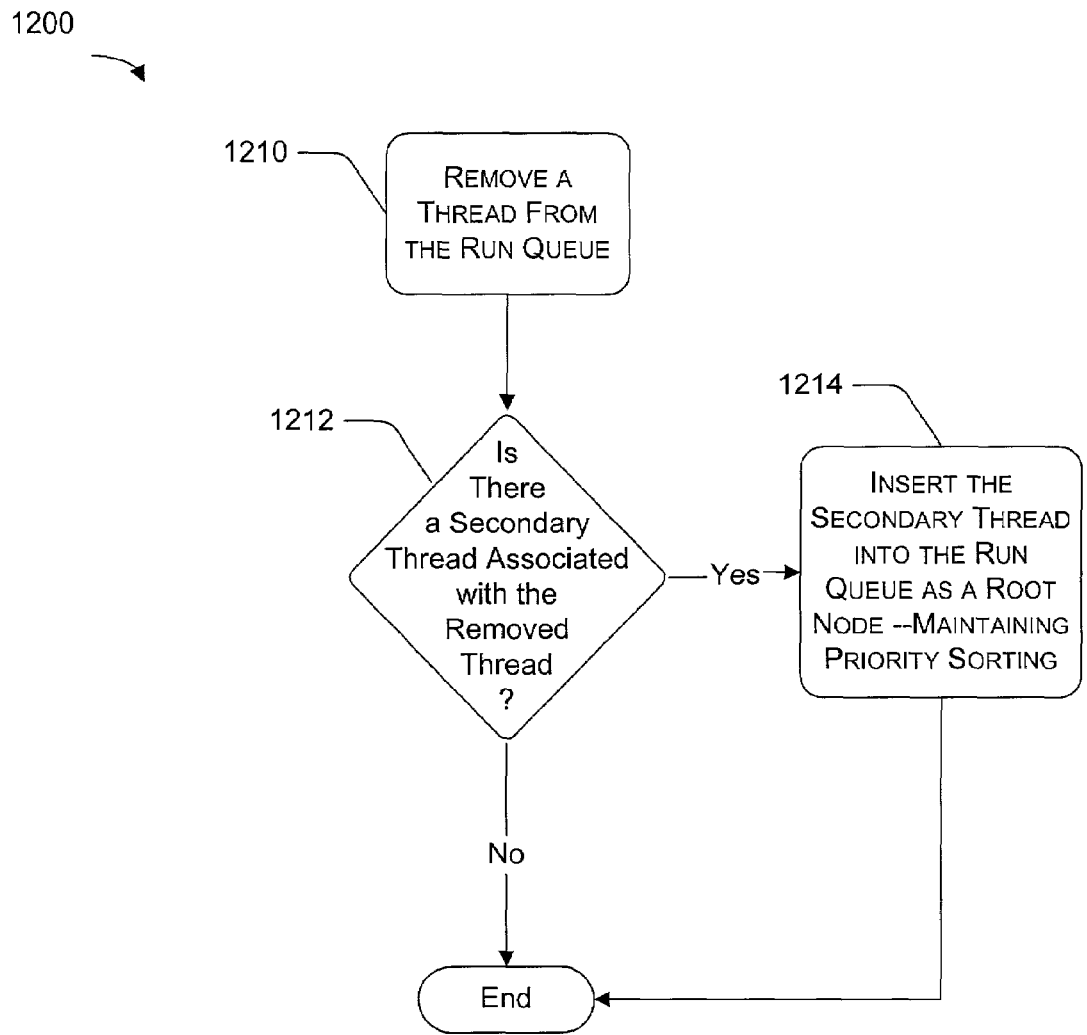
FIG. 12 is a flowchart that shows aspects of an exemplary procedure to remove a thread from run queue.

FIG. 12 is a flowchart that shows an exemplary procedure 1200 to remove a thread from run queue 1100 of FIG. 11. At block 1210, the procedure removes a thread from the run queue for execution. As discussed above, the thread may be a root node such as root node 1104-2 of FIG. 11 that is attached to one or more other secondary nodes in data field 1108-1, or may be a node that is not attached to any secondary nodes such as root node 1104-1. Accordingly, at block 1212, the procedure determines whether the removed node is attached to a secondary node (e.g., root node 1104-2 is attached to secondary node 1104-6). If not, the procedure ends.

Otherwise, if the removed node is attached to a secondary node (block 1212), at block 1214, the procedure inserts the secondary node into the run queue in a manner that maintains the priority based semantics of the run queue. For example, if the removed node (block 1210) is node 1104-4 of FIG. 11, the secondary node is node 1104-9 (having a priority of seven (7)). Block 1214 of the procedure then inserts the secondary node 1104-9 into the run queue before node 1104-9, which has a priority of fifteen, thereby making the secondary node a root node, and thereby maintaining the priority based semantics of the run queue. Significantly, block 1214 of the procedure inserts an additional node into the run queue independent of any access to any other queue such as a sleep queue or a wait queue.

Figure 13:
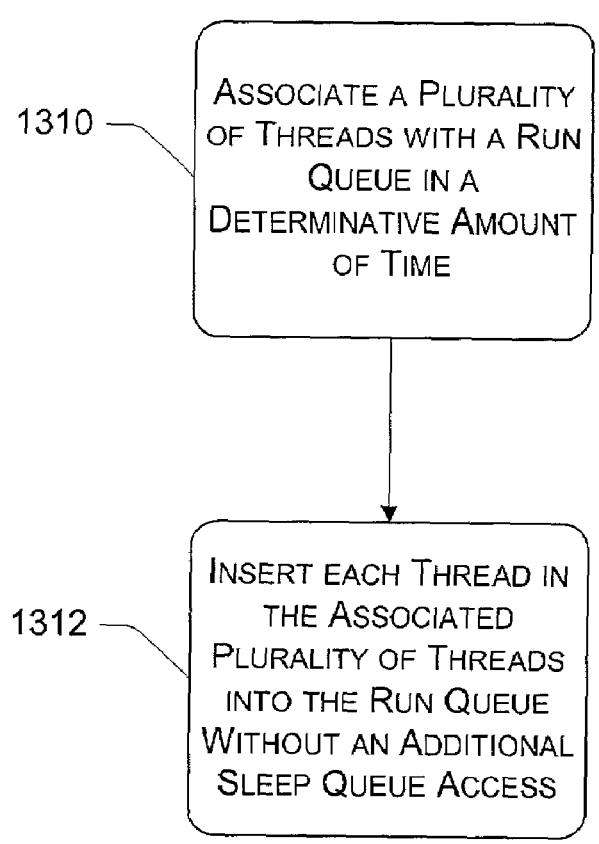
FIG. 13 is a flowchart diagram that illustrates aspects of an exemplary procedure to insert a plurality of threads into a run queue in a determinative amount of time that is independent of the number of threads associated with the run queue at any one time.

FIG. 13 is a flowchart diagram that shows an exemplary procedure 1300 to insert a plurality of threads into a run queue in a determinative amount of time. At block 1310, the procedure associates a plurality of threads with a run queue of FIG. 11 in a determinative amount of time as described above in reference to FIG. 11. At block 1312, the procedure inserts each thread in the associated plurality of threads (block 1310) into the run queue without an additional sleep queue access (see, sleep queue 300 of FIG. 3).

Exemplary Computing Environment

FIG. 14 illustrates an example of a suitable computing environment 1400 wherein an exemplary system and procedure to manage a run queue may be implemented. Exemplary computing environment 1400 is only one example of a suitable computing environment and is not intended to suggest any limitation as to the scope of use or functionality of an exemplary system and procedure to manage a run queue. The computing environment 1400 should not be interpreted as having any dependency or requirement relating to any one or combination of components illustrated in the exemplary computing environment 1400.

The exemplary system and procedure to manage a run queue is operational with numerous other general purpose or special purpose computing system environments or configurations. Examples of well known computing systems, environments, and/or configurations that may be suitable for use with an exemplary system and procedure to manage a run queue include, but are not limited to, personal computers, server computers, thin clients, thick clients, handheld or laptop devices, multiprocessor systems, microprocessor-based systems, set top boxes, programmable consumer electronics, wireless phones, application specific integrated circuits (ASICS), network PCs, minicomputers, mainframe computers, distributed computing environments that include any of the above systems or devices, and the like.

Exemplary run queue management may be described in the general context of computer-executable instructions, such as program modules, being executed by a computer. Generally, program modules include routines, programs, objects, components, data structures, etc. that perform particular tasks or implement particular abstract data types. Exemplary run queue management may also be practiced in distributed computing environments where tasks are performed by remote processing devices that are linked through a communications network. In a distributed computing environment, program modules may be located in both local and remote computer storage media including memory storage devices.

As shown in FIG. 14, the computing environment 1400 includes a general-purpose computing device in the form of a computer 1410. The components of computer 1410 may include, by are not limited to, one or more processors or processing units 1412, a system memory 1414, and a bus 1416 that couples various system components including the system memory 1414 to the processor 1412.

Bus 1416 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus also known as Mezzanine bus.

Computer 1410 typically includes a variety of computer-readable media. Such media may be any available media that is accessible by computer 1410, and it includes both volatile and non-volatile media, removable and non-removable media.

In FIG. 14, the system memory 1414 includes computer readable media in the form of volatile memory, such as random access memory (RAM) 1420, and/or non-volatile memory, such as read only memory (ROM) 1418. A basic input/output system (BIOS) 1422, containing the basic routines that help to transfer information between elements within computer 1410, such as during startup, is stored in ROM 1418. RAM 1420 typically contains data and/or program modules that are immediately accessible to and/or presently be operated on by processor 1412.

Computer 1410 may further include other removable/non-removable, volatile/non-volatile computer storage media. By way of example only, FIG. 14 illustrates a hard disk drive 1424 for reading from and writing to a non-removable, non-volatile magnetic media (not shown and typically called a "hard drive"), a magnetic disk drive 1426 for reading from and writing to a removable, nonvolatile magnetic disk 1428 (e.g., a "floppy disk"), and an optical disk drive 1430 for reading from or writing to a removable, non-volatile optical disk 1432 such as a CD-ROM, DVD-ROM or other optical media. The hard disk drive 1424, magnetic disk drive 1426, and optical disk drive 1430 are each connected to bus 1416 by one or more interfaces 1434.

The drives and their associated computer-readable media provide nonvolatile storage of computer readable instructions, data structures, program modules, and other data for computer 1410. Although the exemplary environment described herein employs a hard disk, a removable magnetic disk 1428 and a removable optical disk 1432, it should be appreciated by those skilled in the art that other types of computer readable media which can store data that is accessible by a computer, such as magnetic cassettes, flash memory cards, digital video disks, random access memories (RAMs), read only memories (ROM), and the like, may also be used in the exemplary operating environment.

A number of program modules may be stored on the hard disk, magnetic disk 1428, optical disk 1432, ROM 1418, or RAM 1420, including, by way of example, and not limitation, an operating system 1438, one or more application programs 1440, other program modules 1442, and program data 1444. Each such operating system 1438, one or more application programs 1440, other program modules 1442, and program data 1444 (or some combination thereof) may include an implementation to manage a run queue.

A user may enter commands and information into computer 1410 through input devices such as keyboard 1446 and pointing device 1448 (such as a "mouse"). Other input devices (not shown) may include a microphone, joystick, game pad, satellite dish, serial port, scanner, or the like. These and other input devices are connected to the processing unit 1412 through a user input interface 1450 that is coupled to bus 1416, but may be connected by other interface and bus structures, such as a parallel port, game port, or a universal serial bus (USB).

A monitor 1452 or other type of display device is also connected to bus 1416 via an interface, such as a video adapter 1454. In addition to the monitor, personal computers typically include other peripheral output devices (not shown), such as speakers and printers, which may be connected through output peripheral interface 1455.

Computer 1410 may operate in a networked environment using logical connections to one or more remote computers, such as a remote computer 1462. Remote computer 1462 may include many or all of the elements and features described herein relative to computer 1410.

Logical connections shown in FIG. 14 are a local area network (LAN) 1457 and a general wide area network (WAN) 1459. Such networking environments are commonplace in offices, enterprise-wide computer networks, intranets, and the Internet.

When used in a LAN networking environment, the computer 1410 is connected to LAN 1457 via network interface or adapter 1466. When used in a WAN networking environment, the computer typically includes a modem 1458 or other means for establishing communications over the WAN 1459. The modem 1458, which may be internal or external, may be connected to the system bus 1416 via the user input interface 1450 or other appropriate mechanism.

Depicted in FIG. 14 is a specific implementation of a WAN via the Internet. Computer 1410 typically includes a modem 1458 or other means for establishing communications over the Internet 1460. Modem 1458, which may be internal or external, is connected to bus 1416 via interface 1450.

In a networked environment, program modules depicted relative to the personal computer 1410, or portions thereof, may be stored in a remote memory storage device. By way of example, and not limitation, FIG. 14 illustrates remote application programs 1469 as residing on a memory device of remote computer 1462. It will be appreciated that the network connections shown and described are exemplary and other means of establishing a communications link between the computers may be used.

Computer-Executable Instructions

An implementation to manage a run queue may be described in the general context of computer-executable instructions, such as program modules, executed by one or more computers or other devices. Program modules typically include routines, programs, objects, components, data structures, and the like, that perform particular tasks or implement particular abstract data types. The functionality of the program modules typically may be combined or distributed as desired in the various embodiments of FIG. 14.

Computer Readable Media

An implementation to manage a run queue may be stored on or transmitted across some form of computer-readable media. Computer-readable media can be any available media that can be accessed by a computer. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

CONCLUSION

Traditional systems and procedures for managing run queues do not allow an operating system to schedule other threads for execution within deterministic/predetermined time parameters. This is because such procedures require a non-deterministic amount of time to operate. Thus, such traditional systems and procedures substantially destroy a desired real-time property aspects of an operating system. In contrast to such traditional systems and procedures, the described subject matter manages a run queue, such that a plurality of threads is associated with the run queue in a deterministic, or bounded amount of time allowing an operating system to schedule other threads for execution within predetermined, deterministic time periods. This deterministic amount of time is independent of the number of threads that are associated with the run queue. Moreover, the subject matter inserts associated threads into the run queue without needing to return to a sleep queue each time that an associated thread is inserted into the run queue.

Although the system and procedure to manage a run queue with bounded time for system-exclusive access has been described in language specific to structural features and/or methodological steps, it is understood that the described subject matter to manage a run queue defined in the appended claims is not necessarily limited to the specific features or operations described. Rather, the specific features and operations are disclosed as preferred forms of implementing the claimed present subject matter.

The invention claimed is:

1. A method implemented by a computer system for managing a run queue comprising a first plurality of threads having a sortable priority that are sorted with respect to one another based on thread priority, the method comprising:
    in a deterministic amount of time equivalent to an amount of time to insert a single thread into the run queue, associating a second plurality of threads from a sleep queue that is priority sorted within the run queue in a manner that maintains a sortable priority of the sleep queue based scheduling semantic of the run queue wherein associating the second plurality of threads with the run queue further includes inserting only a root thread of the second plurality of threads into the run queue; and
    executing respective ones of the threads in view of thread priority.

2. The method of claim 1, wherein the second plurality of threads comprises a root thread, and wherein associating the second plurality of threads with the run queue further comprises inserting only the root thread into the run queue.

3. The method of claim 1, wherein the associating the second plurality of threads with the run queue further comprises inserting each thread in the second plurality of threads into the run queue independent of any additional other queue access.

4. The method of claim 1, wherein the method further comprises:
    removing the root thread from the run queue; and
    responsive to removing the root thread, inserting a next thread of the second plurality of threads into the run queue such that the priority based scheduling semantic of the run queue is preserved.

5. The method of claim 1, wherein the method further comprises:
    inserting a root thread of the second plurality of threads into the run queue;

removing the root thread from the run queue for execution; and responsive to removing the root thread and independent of any additional other queue access, inserting a next thread of the second plurality of threads into the run queue.

6. A system for managing a run queue, the run queue comprising a first plurality of threads, each thread in the first plurality of threads having a respective priority such that the threads is sortable, one to another, the first plurality of threads being sorted such that a thread having a high priority is removed from the run queue before a thread having a lower priority, the system comprising:

memory for storing the run queue and computer-executable instructions;

a processor operatively coupled to the memory, the processor being configured to execute the computer-executable instructions for:

in an amount of time to insert a single thread into the run queue, associating a second plurality of threads from a sleep queue that is priority sorted within the run queue, the association maintains a priority based scheduling semantic of the run queue, wherein associating the second plurality of threads with the run queue further includes inserting only a root thread of the second plurality of threads into the run queue;

removing the root thread from the run queue; and responsive to removing the root thread, inserting a next thread of the second plurality of treads into the ran queue such that the priority based scheduling semantic of the run queue is preserved; and executing respective ones of the threads in view of thread priority.

7. The system of claim 6, wherein associating the second plurality of threads with the run queue is performed independent of more than a single other queue access.

8. The system of claim 6, wherein the second plurality of threads comprises the root thread operatively coupled to one or more other threads of the second plurality of threads, each of the one or more other threads having a respective priority that is a lower priority or an equal priority as compared to a priority of the root thread.

9. The system of claim 6:

wherein the first plurality of threads is a first linked list data structure;

wherein the second plurality of threads is a second linked list data structure comprising the root node that is operatively coupled to one or more other threads in the second plurality of threads; and wherein the single insert operation is an operation comprising inserting the root node into a position in the first linked list data structure.

10. A computer storage media comprising computer-program instructions executable by a processor to manage a run queue of executable threads that are sortable with respect to one another based on thread priority, the computer-program instructions when executed by the processor implementing operations comprising:

in a deterministic amount of time that is independent of the number of threads in a second plurality of threads from a sleep queue that is priority sorted, the deterministic amount of time being a time to insert a single thread into the run queue, associating the second plurality of threads with a first plurality of threads in the run queue in a manner that maintains a priority based scheduling semantic of the run queue, wherein associating the second plurality of threads with the run queue further includes inserting only a root thread of the second plurality of threads into the run queue;

removing the root thread from the run queue;

responsive to removing the root thread, inserting a next thread of the second plurality of threads into the run queue such that the priority based scheduling semantic of the run queue is preserved; and executing respective ones of the threads in view of thread priority.

11. The computer storage media of claim 10, wherein the second plurality of threads comprises a root thread that is operatively coupled to one or more other threads of the second plurality of threads, and wherein the computer-program instructions for associating further comprise instructions for inserting only the root thread into the first plurality of threads.

12. The computer storage media of claim 10, wherein the first plurality of threads is a first linked list data structure, the second plurality of threads is a second linked list data structure comprising a root node that is operatively coupled to one or more other threads in the second plurality of threads, and the deterministic amount of time is a result of a single insert operation to insert the root node into the first linked list data structure.

13. The computer storage media of claim 10, wherein the computer-program instructions for inserting the next thread are performed independent of an other queue.

14. A computer storage media comprising computer-program instructions executable by a processor for:

managing a run queue with a run queue data structure, the run queue data structure comprising:

a first dimension data field comprising a first plurality of threads that are sortable, one to another, with respect to thread priority; and a second dimension data field comprising a second plurality of threads from a sleep queue that are sortable, one to another, based on thread priority of the sleep queue, the second plurality of threads comprising a root thread and one or more other threads, wherein the second plurality of threads are associable with the run queue by inserting only a root thread of the second plurality of threads into the run queue; and executing respective ones of the threads in view of the thread priority.

* * * * *